US008089459B2

(12) United States Patent
Passaro et al.

(10) Patent No.: US 8,089,459 B2
(45) Date of Patent: Jan. 3, 2012

(54) MANUAL CONTROL DEVICE INCLUDING A MAGNETORESISTIVE SENSOR ELEMENT

(75) Inventors: Richard M. Passaro, Fairfield, CT (US); Tony V. Jacques, Bristol, CT (US)

(73) Assignee: Measurement Systems, Inc., Fairfield, CT (US)

( * ) Notice: Subject to any disclaimer, the term of this patent is extended or adjusted under 35 U.S.C. 154(b) by 1221 days.

(21) Appl. No.: 11/146,269

(22) Filed: Jun. 6, 2005

(65) Prior Publication Data

US 2006/0274040 A1 Dec. 7, 2006

(51) Int. Cl.
*G09G 5/08* (2006.01)
(52) U.S. Cl. .................................. 345/161; 324/207.21
(58) Field of Classification Search .................. 345/161; 324/207.2–207.25
See application file for complete search history.

(56) References Cited

U.S. PATENT DOCUMENTS

| 3,331,972 | A | 7/1967 | Moller |
| 4,325,050 | A | 4/1982 | Suszynski |
| 4,459,578 | A | 7/1984 | Sava et al. |
| 4,489,303 | A | 12/1984 | Martin |
| 4,490,710 | A | 12/1984 | Kopsho, Jr. et al. |
| 4,520,242 | A | 5/1985 | Kopsho, Jr. |
| 4,533,827 | A | 8/1985 | Fincher |
| 4,584,577 | A | 4/1986 | Temple |
| 4,661,773 | A | 4/1987 | Kawakita et al. |
| 4,825,157 | A | 4/1989 | Mikan |
| 4,853,630 | A | 8/1989 | Houston |
| 5,160,918 | A | 11/1992 | Saposnik |
| 5,266,917 | A | 11/1993 | Bleeke et al. |
| 5,399,967 | A | 3/1995 | Carscadden |
| 5,421,694 | A | 6/1995 | Baker et al. |
| 5,668,331 | A * | 9/1997 | Schintag et al. ............. 73/865.9 |
| 5,850,142 | A * | 12/1998 | Rountos et al. ............ 324/207.2 |
| 6,212,783 | B1 * | 4/2001 | Ott et al. ........................ 33/1 PT |
| 6,326,781 | B1 * | 12/2001 | Kunde et al. ............ 324/207.21 |
| 6,429,849 | B1 * | 8/2002 | An et al. ....................... 345/161 |

FOREIGN PATENT DOCUMENTS

| DE | 195 03 615 A1 | 8/1995 |
| EP | 0 501 906 A1 | 9/1992 |
| JP | SHO 58-150234 | 10/1983 |

OTHER PUBLICATIONS

Allegro MicroSystems, Inc. Preliminary Data Sheet entitled Ratiometric, Linear Hall-Effect Sensors for High-Temperature Operation (1996).
General Magnetoresistive Sensor for Magnetic Field Measurement, Philips Semiconductors, Sep. 6, 2000.
Contactless Angle Measurement Using KMZ41 and UZZ9001, Application Note AN00004, Author(s): Klaus Dietmayer and Marcus Weser, Philips Semiconductors, Jan. 17, 2000.

* cited by examiner

*Primary Examiner* — Yong H Sim
(74) *Attorney, Agent, or Firm* — Wiggin and Dana LLP

(57) ABSTRACT

A control device comprises a base portion and a handle portion extending from the base portion. The handle portion is movable from side to side relative to the base portion in an X direction, and forward and backward relative to the base portion in a Y direction perpendicular to the X direction. The handle portion is also configured to twist relative to the base portion. A magnetoresistive sensor is located in the handle portion. The magnetoresistive sensor is configured to provide an output signal indicative of a twist angle of the handle portion relative to the base portion. At least one sensor is disposed in the base portion for detecting a position of the handle portion in the X and Y directions.

28 Claims, 6 Drawing Sheets

MANUAL CONTROL DEVICE INCLUDING A MAGNETORESISTIVE SENSOR ELEMENT

BACKGROUND

The present disclosure relates to manual control devices, such as joysticks. More specifically, the present disclosure relates to a manual control device including a magnetoresistive sensor element.

Manual control devices, commonly referred to as joysticks, are used in various apparatus such as video games, heavy construction equipment and aircraft to control parameters such as position, velocity and acceleration. Typically, the joystick has an extended length shaft with a handle at one end and a shaped component at the opposing end that interacts with one or more sensors. Movement of the handle is translated by the sensors into electrical signals that are communicated to the apparatus actuating a desired response.

In one type of joystick, movement of the handle displaces one or more electric potentiometers changing the voltage output. While the potentiometers provide accurately defined signals to the apparatus, the joystick shaft is mechanically coupled to the potentiometers through linkages and gearing. The connection deteriorates over time due to potentiometer and linkage wear. This type of joystick has a large number of moving parts and is subject to premature failure in robust operating environments.

A different type of joystick is disclosed in U.S. Pat. No. 3,331,972 by Möller, that is incorporated by reference in its entirety herein. The Möller patent discloses a joystick having an extended length shaft with a handle at one end and a joint ball at the other end. The joint ball has an embedded magnet that is surrounded by bands of a ferromagnetic material. Movement of the joystick handle completes a magnetic circuit. A number of Hall effect sensors, semiconductor devices that generate a voltage when engaged by a magnetic flux, circumscribe the magnet. Movement of the joystick handle changes the magnetic flux lines, generating a voltage in the Hall effect sensors.

This Hall effect joystick is more robust than a potentiometer-type joystick. The joint ball does not mechanically engage the sensors reducing the risk of mechanical degradation. However, due to inclusion of ferromagnetic components, hysteresis degradation is a problem. As the ferromagnetic components become slightly magnetized, the resulting magnetic field affects the sensors, changing the characteristics of the joystick.

U.S. Pat. No. 5,850,142 to Rountos et al. is directed to an angle measurement device (e.g., a joystick) capable of providing both linear and non-linear control transfer functions directly using a shaped, generally convex, magnet and linear magnetic sensors, such as Hall sensors. This joystick uses non-contacting Hall effect sensors to provide the X and Y-axis output signals. Advantageously, the shape of the magnet is effective to provide a desired transfer function, and the magnet is constructed to minimize magnetic flux distortion, cross talk and hysteresis.

The use of magnetic sensors and magnets in joystick controls requires a careful study of their susceptibility to external magnetic fields and nearby magnetic material such as iron and steel. For example, Hall effect sensors operate by providing an output voltage that is proportional to the intensity and sign of the applied magnetic field. External magnetic fields and nearby magnetic material can affect the Hall effect sensors, changing the characteristics of the joystick.

For certain applications, the sensors can be positioned away from any external magnetic fields and magnetic materials to avoid their interference. For example, in the joystick described in U.S. Pat. No. 5,850,142, the X and Y-axis Hall effect sensors are located in the base of the assembly, which may be mounted below a panel in the final installation. The Hall sensors and the associated magnet assembly are thus located some distance away from the operator and any steel tools or other steel or magnetic objects the operator might bring close to the joystick. Generally, iron or steel objects placed 4 inches or more away from the Hall sensors in the base of the joystick will not interfere with the normal operation of the joystick.

However, the use of Hall effect sensors for a twist axis mounted above the base assembly would not provide the required magnetic immunity. This sensor assembly would be exposed to nearby objects on the control panel or objects that may be temporarily placed on the control panel by the operator. As stated above, the Hall sensors are sensitive to magnetic field intensity so a nearby magnet or a steel tool will modulate and distort this field intensity and cause spurious output signals from this twist axis sensor.

Thus, there remains a need for a joystick that provides increased magnetic immunity, particularly for twist axis sensors which, because of their relatively unshielded position, are more susceptible to external magnetic fields.

BRIEF SUMMARY

In one aspect, there is provided a control device comprising a base portion; a handle portion extending from the base portion; and a magnetoresistive sensor configured to provide an output signal indicative of a twist angle of the handle portion relative to the base portion.

In another aspect, there is provided a control device comprising a base portion and a handle portion extending from the base portion. The handle portion is movable from side to side relative to the base portion in an X direction, and forward and backward relative to the base portion in a Y direction perpendicular to the X direction. The handle portion is also configured to twist relative to the base portion. A magnetoresistive sensor is located in the handle portion. The magnetoresistive sensor is configured to provide an output signal indicative of a twist angle of the handle portion relative to the base portion. At least one sensor is disposed in the base portion for detecting a position of the handle portion in the X and Y directions.

In yet another aspect, there is provided a method for determining a twist angle of a handle portion of a manual control device. The method comprises: sensing a resistance across a magnetoresistive material; and determining a twist angle of the handle portion as a function of the change in resistance.

BRIEF DESCRIPTION OF THE DRAWINGS

Referring now to the Drawing wherein like items are numbered alike in the several Figures.

DETAILED DESCRIPTION

Figure 1:
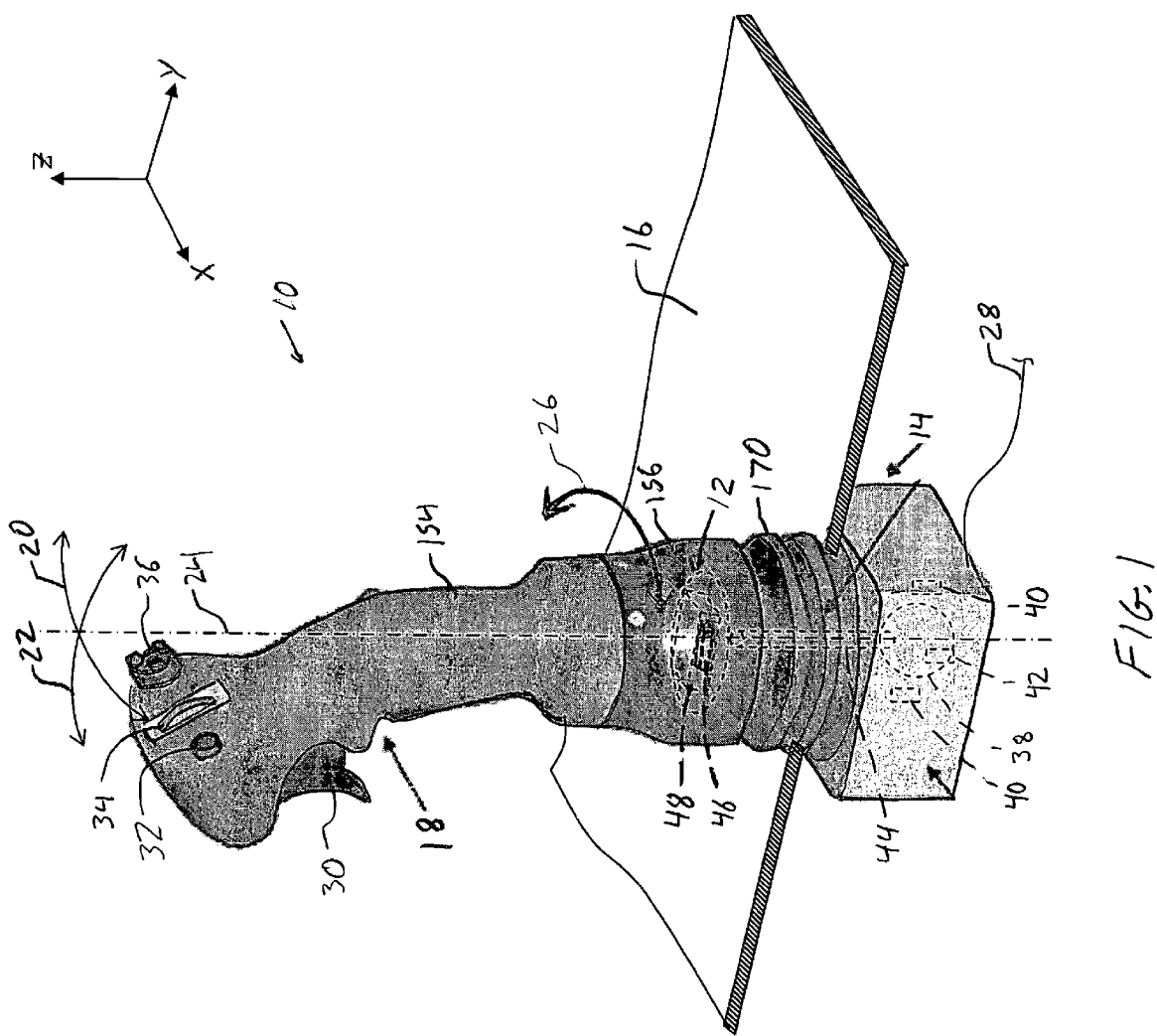
FIG. 1 is a perspective view of a manual control device including a magnetoresistive sensor for twist angle measurement.

FIG. 1 depicts a manual control device (joystick) 10 including a magnetoresistive sensor 12 for twist angle measurement. The joystick 10 includes a base portion 14, which is fixed beneath a control panel 16, and a handle portion 18, which extends above the control panel 16 where it can be grasped and manipulated by operating personnel. The handle portion 18 is movable in the X and Y directions (e.g., side to side and forward and backward) as indicated by arrows 20 and 22, respectively. The handle portion 18 may also be twisted about its longitudinal axis 24, as indicated by arrow 26. The joystick 10 provides an electrical signal 28 that is indicative of the X, Y, and twist axis position (twist angle) of the handle portion 18. The signal 28 is output to an apparatus to be controlled.

The handle portion 18 may include additional input devices, such as a trigger 30, a button 32, a dial 34, a thumb-operated joystick 36, and the like, that can be manipulated by fingers of the operator while grasping the handle portion 18. The output signal 28 may further indicate the manipulation and position of the various input devices.

Disposed within the base portion 14 and mounted below the panel 16, is a magnet component 38 and at least two adjacent sensors 40, 42 capable of providing "X" and "Y" axis information concerning movement of the magnet component 38. The magnet component 38 is attached to a shaft 44, which extends to the handle portion 18 and moves in the X and Y directions with the handle portion 18. The sensors 40 and 42 may be Hall effect sensors as described in U.S. Pat. No. 5,850,142, which is incorporated by reference herein in its entirety. The Hall effect sensors 40 and 42 and associated magnet component 38 are located in the base portion 14, which is mounted below the panel 16 in the final installation. The Hall effect sensors 40 and 42 and the associated magnet component 38 are thus located some distance away from the operator and any steel tools or other steel or magnetic objects the operator might bring close to the joystick 10.

Disposed within the handle portion 18 and mounted above the panel 16, is the magnetoresistive sensor 12 for twist angle measurement. As will be described in further detail hereinafter, the magnetoresistive sensor 12 includes a sensor element 46, which is fixed relative to the base portion 14, and a magnet assembly 48, which twists with the handle portion 18.

As used herein, a magnetoresistive sensor is any sensor that makes use of the magnetoresistive effect, the property of a current carrying magnetic material to change its resistance in the presence of an external magnetic field. For example, the electrical resistance of certain ferromagnetic alloys, such as Permalloy, is influenced by external magnetic fields. Permalloy is an alloy of nickel and iron containing from about 35 to about 90 percent nickel and from about 10 percent to about 65 percent iron, and more preferably containing from about 75 percent to about 85 percent nickel and from about 15 percent to about 25 percent iron.

Figure 2:
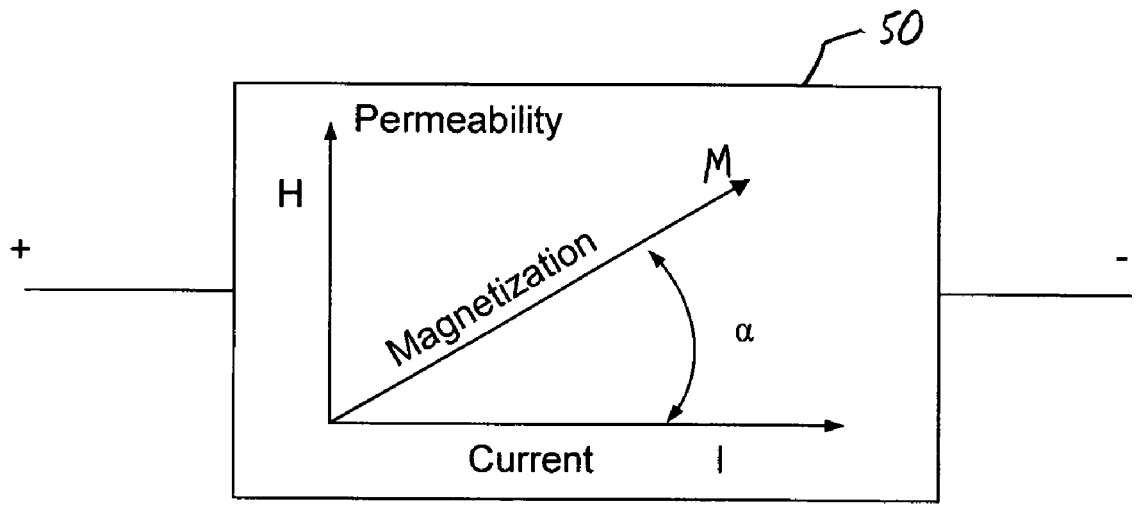
FIG. 2 is a schematic depiction of a strip of magnetoresistive material.

Referring to FIG. 2, the electrical resistance of a strip 50 of ferromagnetic material (e.g., Permalloy) changes with the angle α between an internal magnetization vector M in the strip 50 and the vector of electrical current I flowing through the strip 50. When an external magnetic field saturates the strip 50, the internal magnetization vector M of the strip 50 follows the external magnetic field vector H. The direction of the external magnetic field vector H can be evaluated by sensing this change in resistance.

More specifically, referring to FIG. 2, when no external magnetic field is present, the strip 50 has an internal magnetization vector M parallel to the current flow (α=0). If an external magnetic field H is applied, parallel to the plane of the strip 50 but perpendicular to the current flow, the internal magnetization vector M of the strip 50 will rotate around an angle α. As a result, the resistance R of the strip 50 will change as a function of the rotation angle α, as given by:

$$R = R_0 + \Delta R_0 \cos^2 \alpha \quad (1)$$

where $R_0$ and $\Delta R_0$ are material constants.

Figure 3:
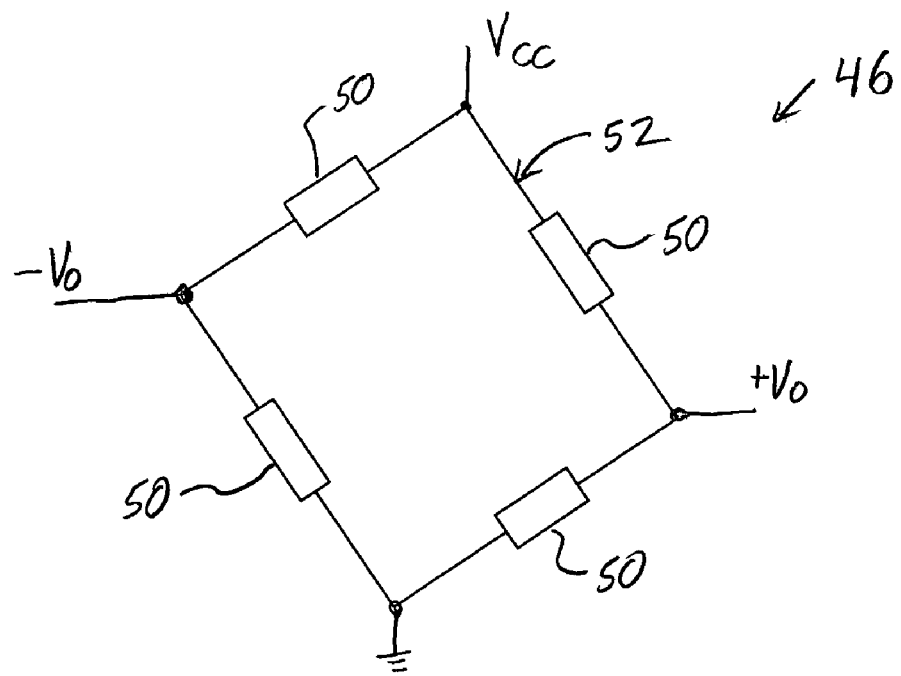
FIG. 3 is a schematic depiction of a magnetoresistive sensor element including a single Wheatstone bridge circuit.

Referring to FIG. 3, four Permalloy strips 50 are arranged in a Wheatstone bridge circuit 52, where Vcc is the supply voltage and +Vo, −Vo are the output signals, to form the magnetoresistive sensor element 46. According to the relationship of Equation (1), the differential output signal (+Vo, −Vo) of the Wheatstone bridge 52 is proportional to sin 2α. Thus a sensor element 46 comprising one Wheatstone bridge 52 can measure an angular range of 90 degrees. However, it will be appreciated that a change in temperature will cause a change in resistance of the strips 50, which in turn will affect signal amplitude. Therefore, with a single Wheatstone bridge configuration, temperature compensation of the differential output signal (+Vo, −Vo) may be required.

Figure 4:
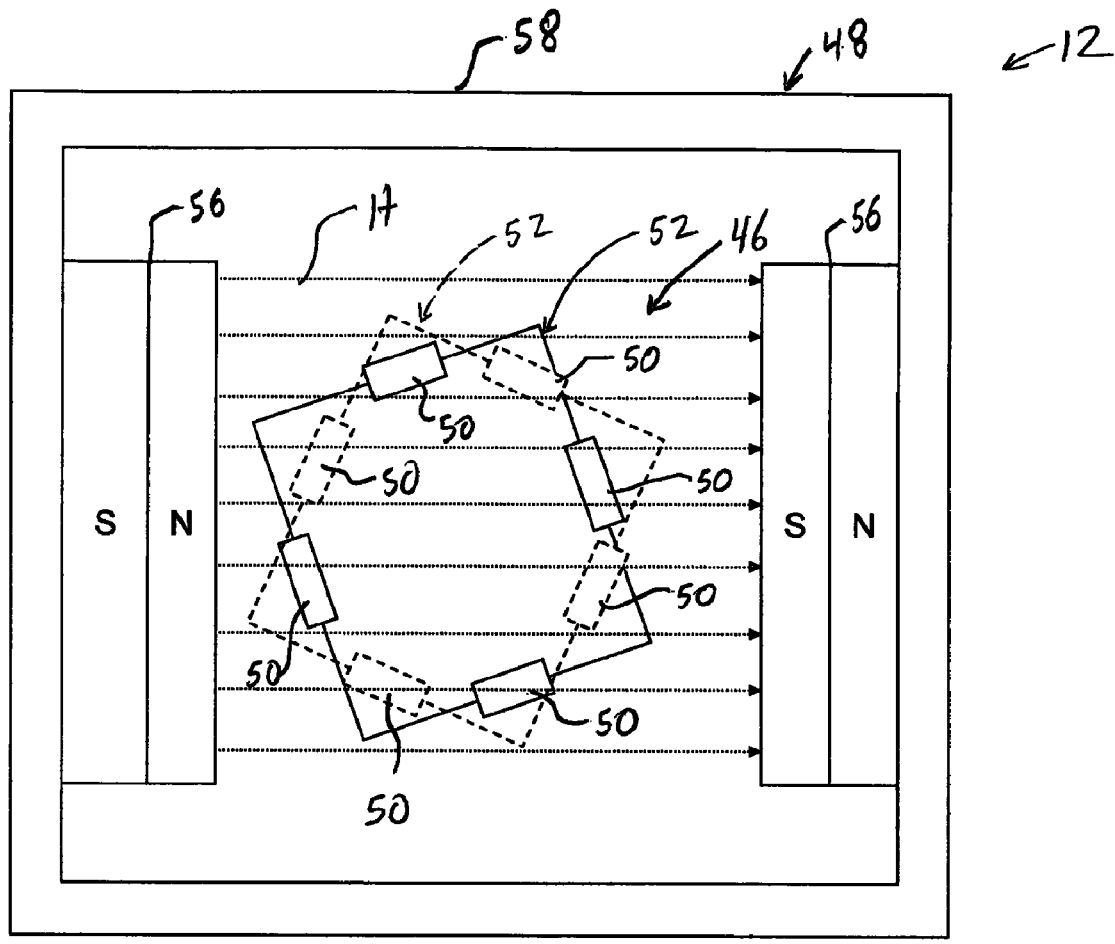
FIG. 4 is a schematic depiction of a magnetoresistive sensor with a sensor element including two Wheatstone bridge circuits.
Figure 5:
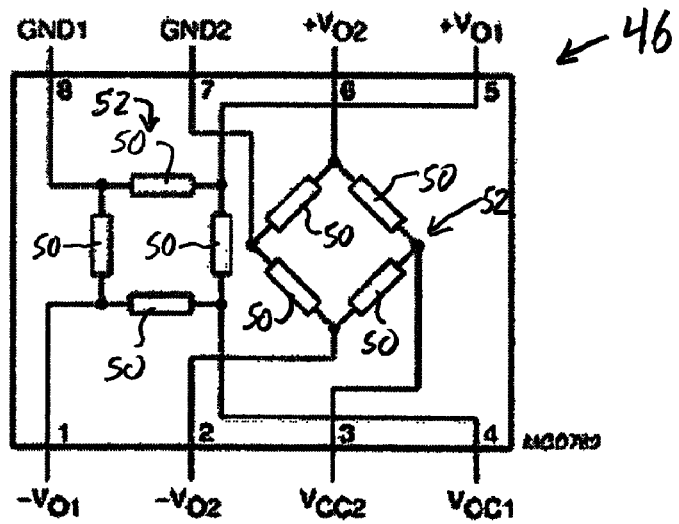
FIG. 5 is a diagram of the magnetoresistive sensor of FIG. 4.

Referring to FIG. 4, to avoid the need for temperature compensation, the magnetoresistive sensor element 46 may comprise two Wheatstone bridge circuits 52 placed on a single substrate. The Wheatstone bridge circuits 52 are built onto the substrate such that they are mechanically positioned at an offset angle of 45 degrees to each other. In the presence of a magnetic field H strong enough to saturate the bridge leg elements (strips) 50, the bridge leg elements 50 change resistance and thus provide a changing differential output signal for each Wheatstone bridge circuit 52 (+Vo$_1$, −Vo$_1$ and +Vo$_2$, −Vo$_2$). The bridge elements 50 are sensitive to the direction or angle of the applied magnetic field H, and because there are two bridge circuits 52, there are two output signals (+Vo$_1$, −Vo$_1$ and +Vo$_2$, −Vo$_2$). A schematic diagram of the magnetoresistive sensor element 46 is shown in FIG. 5.

The magnetic field H is generated by the magnet assembly 48. The magnet assembly 48 comprises two magnets 56 (e.g., two samarium cobalt magnets) connected to a high permeability flux ring 58 that completes the magnetic circuit. While two magnets 56 are shown, it will be appreciated that one or more magnets 56 may be used.

The output signals can be described by X=X$_0$ sin 2α and Y=Y$_0$ cos 2α, where X is the differential output signal +Vo$_1$, −Vo$_1$ across one Wheatstone bridge circuit 52 and Y is the differential output signal +Vo$_2$, −Vo$_2$ across the other Wheatstone bridge circuit 52. As the magnetic field H is continuously rotated through various angles α, the output signals X, Y will be sinusoidal with a phase angle of 90 degrees between them. The amplitudes X$_0$ and Y$_0$ of the signals will be nearly equal because the two bridges are part of the same substrate. The signal offsets will also be nearly equal and in high resolution designs they can easily be adjusted equal to each other.

An unknown angle α measurement can be made from the relationship α=½ arc tan(X/Y). Note that the resulting angle measurement does not depend upon the absolute amplitude of the signals X and Y but upon the ratio of the two signals X and Y. The effects of temperature and changes in the magnetic field intensity will affect both signals but the ratio of the two will remain the same. Therefore, the magnetoresistive sensor 12 has a good measure of magnetic field intensity immunity. Indeed, the present inventors have found that the use of the magnetoresistive sensor 12 for twist angle measurement provides better magnetic immunity than other contactless sensors (e.g., Hall effect sensors), thus allowing the magnetoresistive sensor 12 to mounted above the base portion 14 and control panel 16 (FIG. 1) without being adversely affected by nearby objects on the control panel 16 or objects that may be temporarily placed on the control panel 16 by the operator. Additionally, the magnetoresistive sensor 12 provides the same advantages as all other contactless measurement systems (e.g., Hall effect sensors). That is, they are free of wear and they can be completely encapsulated for protection.

Figure 6:
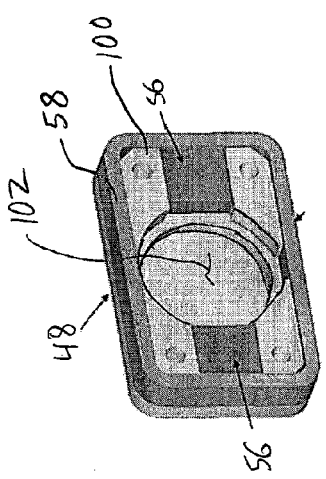
FIG. 6 is a perspective view of a magnet assembly in the magnetoresistive sensor.

Referring to FIG. 6, a perspective view of the magnet assembly 48 is shown. In the magnet assembly 48, the two magnets 56 are secured to a retainer 100 and are positioned on opposite sides of a generally circular recess 102 disposed in the retainer 100. The retainer 100 is preferably formed from a non-magnetic material (e.g., plastic). The magnets 56 are connected to the high permeability flux ring 58, which is designed to complete the magnetic circuit and to provide a maximum amount of magnetic flux directly across the circular recess 102, which receives the magnetoresistive sensor element 46. The flux ring 58 is also attached to the retainer 100. In the embodiment shown, the magnets 56 may each have dimensions of about 8 millimeters (mm) wide by about 7.5 mm long by 3 about mm thick. These magnets 56 are magnetized through the 7.5 mm dimension.

Figure 7:
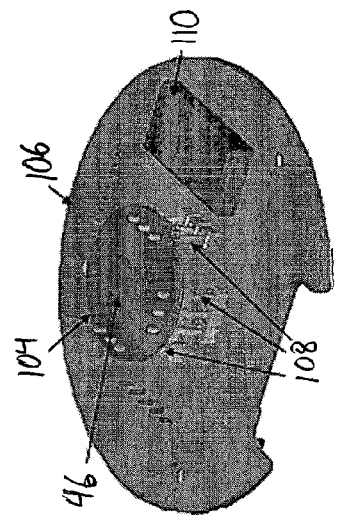
FIG. 7 is a perspective view of the sensor element disposed on a printed circuit board.

Referring to FIG. 7, the magnetoresistive sensor element 46 is attached to a small, circular printed circuit (PC) board 104, which is received in the recess 102 in the magnet assembly 48 (FIG. 6). The PC board 104 is connected to a second, slightly larger, PC board 106 using nine conductive standoff pins 108. The conductive standoff pins 108 are used to position the magnetoresistive sensor element 46 within the recess 102 in the magnet assembly 48 (FIG. 6), and thus directly into the magnetic field generated by the magnet assembly 48.

Mounted to the second PC board 106 is an integrated circuit (IC) chip 110 and associated components. The IC chip 110 is configured to condition the signals received from the sensor element 46 and provide a digital output signal indicative of a twist angle measurement between 0 and 180 degrees. For example, the IC chip 110 may sample the differential sensor signals $+/-Vo_1$ and $+/-Vo_2$ and convert the signals into the digital domain. The IC chip 110 may then use the digital representations of the two signals to calculate the angle $\alpha$. If needed, the IC chip 110 may offset the differential sensor signals $+/-Vo_1$ and $+/-Vo_2$ by a compensation voltage. The sensor element 46 and IC chip 110 may comprise a KMZ41 magnetoresistive sensor and a UZZ9001 Signal Conditioning IC chip, respectively, which are commercially available from Royal Philips Electronics, Amsterdam, the Netherlands. Application Note AN00004 entitled Contactless Angle Measurement using KMZ41 and UZZ9001, from Philips Semiconductors, which is incorporated by reference herein in its entirety, describes the use of these circuit components to measure an angle between the KMZ41 sensor IC and a magnetic field provided by a rotating magnet assembly.

Figure 8:
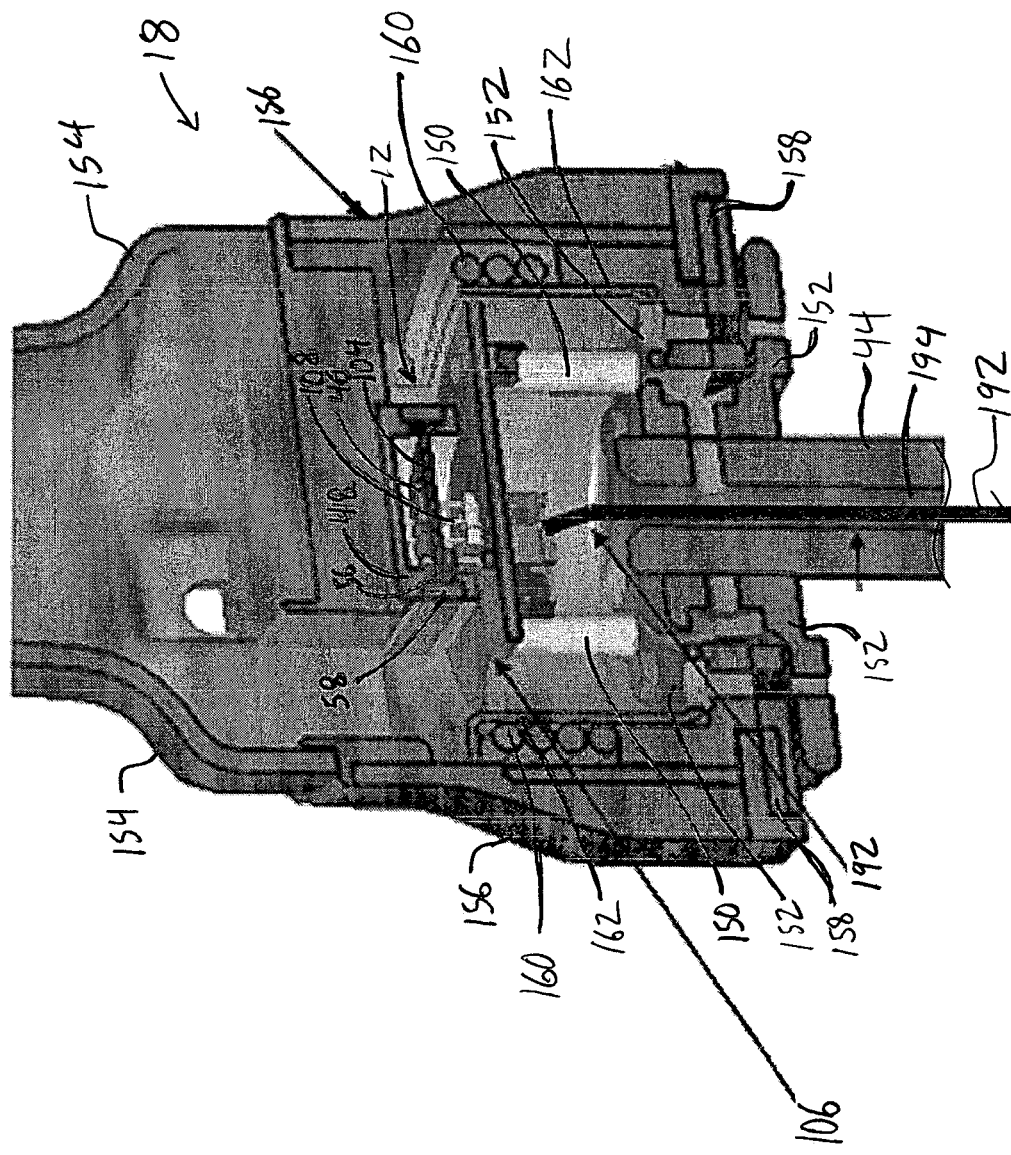
FIG. 8 is a cross-sectional perspective view of a handle portion of the manual control device.

Referring to FIG. 8 the first and second PC boards 104 and 106 are shown installed in the handle portion 18. The second PC board 106 is attached by columns 150 to a retainer plate 152, which is rigidly secured to the shaft 44. The PC boards 104 and 106, columns 150, retainer plate 152, and shaft 44 do not twist with the handle portion 18. The columns 150 and retainer plate 152 may be made from a rigid, non-magnetic material (e.g., aluminum, plastic, etc.).

The handle portion 18 includes a grip 154 onto which the operator grabs when operating the joystick 10. The handle portion 18 further includes a grip housing 156 attached to the bottom of the grip 154. The grip housing 156 is a generally cylindrical collar that is disposed around the magnetoresistive sensor 12 and retainer plate 152. A seating interface between the grip housing 156 and the retainer plate 152 includes a stainless steel needle thrust bearing 158, which contacts a surface of the retainer plate 152 that is coated with a low coefficient friction polymer such as nylon or "Teflon" (trademark of DuPont, Wilmington, Del. for polytetrafluroethylene). The bearing 158 and Teflon coated surfaces minimize friction and allow for a smooth feel when the handle portion 18 is twisted.

In the embodiment shown, the magnet assembly 48 is attached to a lower surface of the grip 154, and the grip 154, grip housing 156, and magnet assembly 48 twist as one when the handle portion 18 is twisted about its axis 24 (FIG. 1). It is contemplated, however, that the sensor 12 may be arranged such that the sensor element 46 is the part that rotates, and the magnet assembly 48 remains stationary.

The handle portion 18 is configured to have a constant tension during rotation and when released is returned to center. This is accomplished by using a torsion spring 160, which is disposed between an inner surface of the grip housing 156 and a generally cylindrical spring retainer 162, which is secured at one end to the retainer plate 152. For example, the handle portion 18 may be configured to twist about the axis 24 (FIG. 1) over a range of ±26°, with the torsion spring 160 being effective to return the handle portion 18 to 0° from any point within this range.

Figure 9:
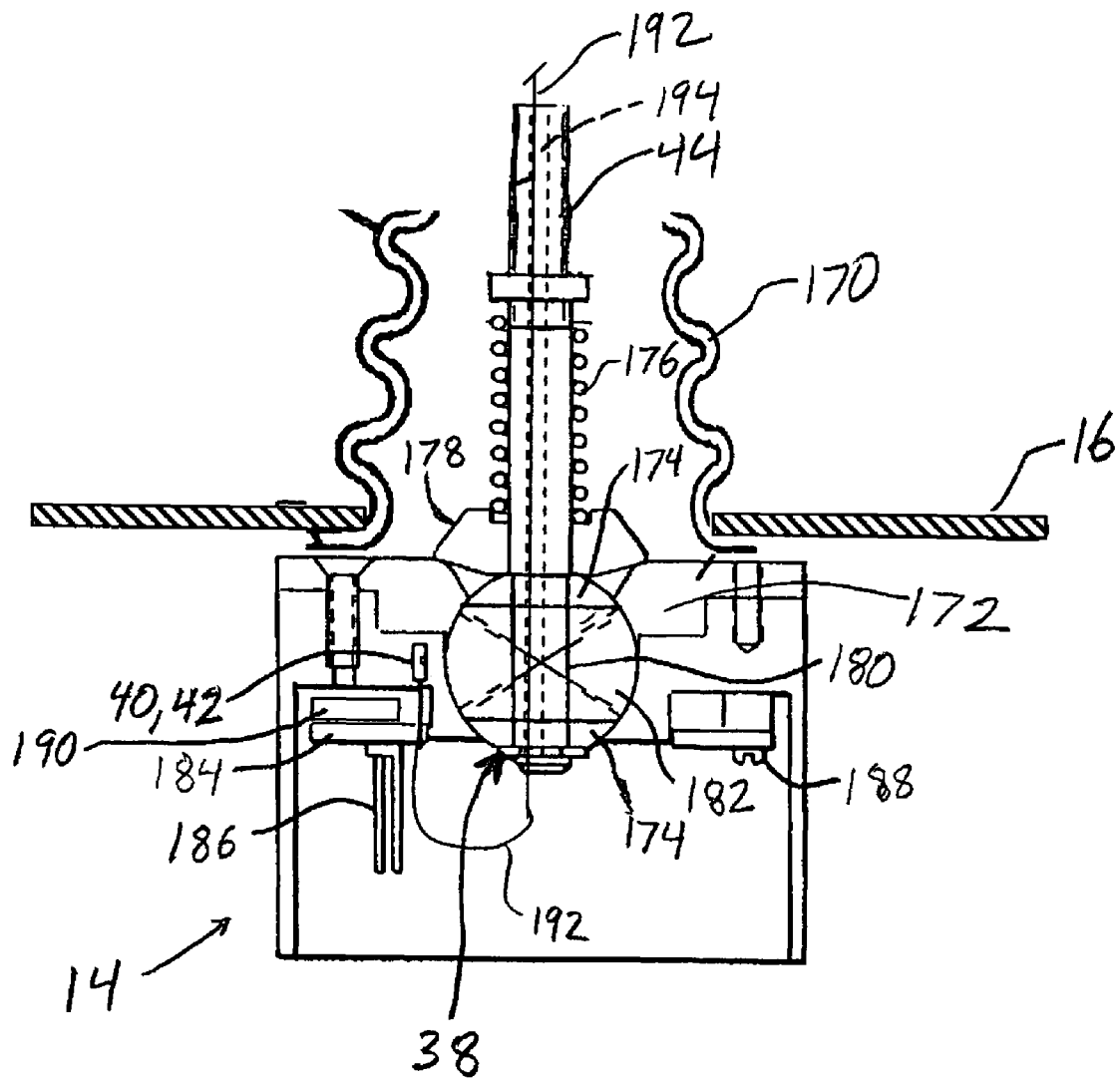
FIG. 9 is a cross-sectional perspective view of a base portion of the manual control device.

Referring to FIG. 9, the base portion 14 of the joystick 10 is shown. The base 14 portion includes the shaft 44, which extends from the magnet component 38 to the retainer plate 152 of the handle portion 18 (FIG. 8). The shaft 44 may be formed from any strong, non-magnetic, material that resists deflection and bending in use. Particularly preferred are non-magnetic stainless steels. An external boot seal 170, typically formed from neoprene rubber or another flexible elastomer, extends between the base portion 14 and the retainer plate 152 of the handle portion 18 (FIG. 8) to keep dirt, oil and other contaminants from the interior of the joystick 10, while allowing the handle portion 18 to be moved in the X and Y directions (as indicated by arrows 20 and 22 of FIG. 1) relative to the base portion 14.

A non-magnetic bushing 172 contacts an arc portion 174 of the magnet component 38. To reduce friction, the non-magnetic bushing 172 is formed from a polymer such as nylon, "DELRIN" (trademark of DuPont for acetal homopolymer) or Teflon. Movement of the handle 42 rotates the magnet component 38 through approximately 30 degrees of rotation. A centering spring 176 applies a force to a sliding shoe 178, which is effective to return the magnet component 38 to a neutral position with the equator of the magnet component 38 aligned with the magnetic sensors 24.

The magnet component 38 may be a solid, curvilinear-shaped component such as that described in U.S. Pat. No. 5,850,142 to Rountos et al. The magnet component 38 is generally symmetric about an axially disposed hole 180 that extends from the magnetic poles (N,S) and is adapted to receive the shaft 44.

The magnet component 38 may have a continuous magnetic portion 182 that, with the exception of the axially disposed through hole 180, is not interrupted by air gaps or other magnetic flux distorting materials. To minimize cross-talk, the magnetic portion 182 is preferably an integral, hybrid-type, magnet having a uniform mixture of magnetic powders dispersed in a polymer matrix. Exemplary are a mixture of a rare earth component and a ferritic component dispersed in a polymer matrix, such as a mixture of neodymium powder and ferrite powder dispersed in a nylon binder. Alternatively, the ferritic component may be omitted in favor of neodymium powder alone. Such a magnet is available, as Arnold #2403 magnet material, from the Arnold Engineering Company of Marengo, Ill.

The magnetic portion 182 is magnetized by conventional means, typically by interaction with a high strength, highly directionalized, magnetic field. The magnetic north and south poles are aligned along a longitudinal axis centering the axially disposed hole 180. The magnetic portion 182 may have a magnetic flux density in the range of from about 2500 gauss to about 6000 gauss, and preferably on the order of about 3500 gauss to about 4500 gauss.

To reduce wear and decrease friction, low coefficient of friction arc portions 174 are mounted to the flat surfaces of the magnetic portion 182. Typically, the arc portions 174 are formed from a low coefficient friction polymer such as nylon or Teflon. To further reduce friction, the magnetic portion 182 may be coated with a thin, on the order of 0.001 inch to 0.005 inch layer of a low coefficient of friction polymer such as nylon or Teflon.

As described in U.S. Pat. No. 5,850,142 to Rountos et al., the magnetic portion 182 may be shaped to provide a desired transfer function and may be constructed to be effective to minimize magnetic flux distortion. Magnetic flux distortion occurs when a foreign material intersects and distorts the magnetic flux lines, or when the air gap distance varies. As such, ferromagnetic materials are preferably avoided.

Preferably, at least two magnetic sensors 40 and 42 are disposed about the circumference of the magnet component 38 separated by 90 degrees. More preferably, each sensor 40 and 42 has a corresponding sensor 40 or 42 positioned on a diametrically opposite side of the magnet component 38. Each set of two corresponding sensors 40 and 42 is capable of providing "X" and "Y" axis information concerning movement of the magnetic portion 38. Each pair of sensors 40 and 42 provide dual redundant signals, highly desirable in applications such as aircraft where high reliability is mandatory. For higher redundancies, more sensors 40 and 42 may be provided.

Each magnetic sensor 40 and 42 is electrically connected to a PC board 184 having leads 186 disposed thereon that provide for electrical interconnection of the output to an apparatus to be controlled. Screws 188 hold the printed circuit board 184 in place.

The PC board 184 contains a microcontroller 190, amplifier circuits, analog to digital converters, the X and Y-axis Hall effect sensors 40, 42, and other associated components. Signals from the Hall effect sensors 40, 42 are digitized by an analog to digital converter and the microcontroller 190. The PC board 184 is electrically connected to the two PC boards 104 and 106 (FIG. 8) by a small cable assembly 192, which extends through an axial hole 194 in the shaft 44, as indicated in FIG. 7 and FIG. 8. The microcontroller 190 may communicate with the IC chip 110 on the PC board 106 (FIG. 7) using a common, Serial Peripheral Interface (SPI) synchronous serial bus.

The microcontroller 190 will communicate with the IC chip 110 to read the current angle between the magnet assembly 48, which is secured to the handle portion 18, and the magnetoresistive sensor element 46, which is fixed relative to the base portion 14. The angle data may be output from the IC chip 110 as a 13 bit value representing an angle of rotation of approximately 90 degrees, plus and minus the joystick twist axis rotation. It has been determined that resolutions on the order of +/−0.022 degrees are attainable. Upon receiving the signal, the microcontroller 190 calibrates the twist axis null position and scales the full scale clockwise and counterclockwise rotation positions to provide a positive and negative (two's complements) output signal. The microcontroller 190 may output to leads 186 a serial output signal containing the X-axis, Y-axis, and twist axis position data along with any data from the additional input devices on the handle portion 18 (e.g., data from trigger 30, button 32, dial 34, or thumb-operated joystick 36).

It is apparent that there has been provided in accordance with the present invention a magnetically actuated control device that fully satisfies the objects, features and advantages set forth hereinabove. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A control device comprising:
   a base portion disposed at one side of a panel and including a magnet component and a first set of sensors; and
   a handle portion extending from the base portion to the other side of the panel, the handle portion having less electromagnetic shielding than the base portion,
      the handle portion including a substantially cylindrical housing and a second set of sensors,
         the housing disposed around the second set of sensors and having an interior wall radially displaced from the second set of sensors and an exposed exterior wall,
         the second set of sensors including a magnetoresistive sensor including a magnetoresistive sensor element and a magnet assembly, the magnetoresistive sensor configured to provide an output signal indicative of a twist angle of the handle portion relative to the base portion,
   so that the first set of sensors and the second set of sensors are disposed on opposite sides of the panel, the housing and one of the magnetoresistive sensor element and the magnet assembly twist as one in accordance with twist of the handle portion,
   and wherein said output signal comprises two signals each related to the twist angle, a ratio thereof being related to the twist angle and thereby providing a twist angle measurement substantially unaffected by magnetic fields or magnetic materials external to the device.

2. The control device of claim 1, wherein the magnetoresistive sensor is attached to a grip portion of the handle portion, where the grip portion is held by an operator of the device.

3. The control device of claim 1, wherein the handle portion is movable from side to side in an X direction, and forward and backward in a Y direction perpendicular to the X direction, and wherein the first set of sensors in the base portion includes at least one sensor for detecting a position of the handle portion in the X and Y directions.

4. The control device of claim 1, wherein the magnet assembly is secured relative to one of: the handle portion and the base portion; and the magnetoresistive sensor element is secured relative to the other of: the handle portion and the base portion.

5. The control device of claim 3, wherein the sensors include Hall effect sensors.

6. The control device of claim 4, wherein the magnetoresistive sensor element includes at least one Wheatstone bridge circuit having leg elements formed from magnetoresistive material.

7. The control device of claim 4, wherein the magnet assembly includes at least one magnet coupled to a flux ring to form a magnetic circuit.

8. The control device of claim 6, wherein the magnetoresistive sensor element includes two Wheatstone bridge circuits disposed on a common substrate, the two Wheatstone bridge circuits being positioned at an offset angle of 45 degrees to each other.

9. A control device comprising:
a base portion disposed at one side of a panel and including a magnet component and a first set of sensors; and
a handle portion extending from the base portion to the other side of the panel, the handle portion having less electromagnetic shielding than the base portion, the handle portion including a substantially cylindrical housing and a second set of sensors, the housing disposed around the second set of sensors and having an interior wall radially displaced from the second set of sensors and an exposed exterior wall, the handle portion being movable from side to side relative to the base portion in an X direction, and forward and backward relative to the base portion in a Y direction perpendicular to the X direction;
the second set of sensors including a magnetoresistive sensor located in the handle portion, the magnetoresistive sensor including a magnetoresistive sensor element and a magnet assembly and being configured to provide an output signal indicative of a twist angle of the handle portion relative to the base portion,
the handle portion also being configured to twist relative to the base portion so that the housing and one of the magnetoresistive sensor element and the magnet assembly twist as one in accordance with twist of the handle portion; and
the first set of sensors including at least one sensor disposed in the base portion for detecting a position of the handle portion in the X and Y directions, so that the first set of sensors and the second set of sensors are disposed on opposite sides of the panel,
and wherein said output signal comprises two signals each related to the twist angle, a ratio thereof being related to the twist angle and thereby providing a twist angle measurement substantially unaffected by magnetic fields or magnetic materials external to the device.

10. The control device of claim 9, wherein the sensors disposed in the base portion include Hall effect sensors.

11. The control device of claim 9, wherein the magnet assembly is secured relative to one of: the handle portion and the base portion; and the magnetoresistive sensor element is secured relative to the other of: the handle portion and the base portion.

12. The control device of claim 11, wherein the magnetoresistive sensor element includes at least one Wheatstone bridge circuit having leg elements formed from magnetoresistive material.

13. The control device of claim 11, wherein the magnet assembly includes at least one magnet coupled to a flux ring to form a magnetic circuit.

14. The control device of claim 12, wherein the magnetoresistive sensor element includes two Wheatstone bridge circuits disposed on a common substrate, the two Wheatstone bridge circuits being positioned at an offset angle of 45 degrees to each other.

15. A method for determining a twist angle of a handle portion of a manual control device relative to a base portion thereof, the method comprising:
providing a magnet assembly and a magnetoresistive material in the handle portion, the handle portion having less electromagnetic shielding than the base portion, the magnet assembly being attached to a grip portion of the handle portion and surrounded by a grip housing having an interior wall radially displaced from the magnet assembly and magnetoresistive material and an exposed exterior wall, where the grip portion is held by an operator of the device;
sensing a resistance across the magnetoresistive material; and
determining a twist angle of the handle portion as a function of the change in resistance in accordance with a ratio of two signals each related to the twist angle, the ratio being related to the twist angle and thereby providing a twist angle measurement substantially unaffected by magnetic fields or magnetic materials external to the device,
wherein the magnet assembly and the housing twist as one in accordance with twist of the handle portion.

16. The method of claim 15, wherein
the magnetoresistive material and the magnet assembly are included in a magnetoresistive sensor,
the resistance across the magnetoresistive material changes in response to a change in a direction of a magnetic field relative to a direction of current flow through the magnetoresistive material, the magnetic field being generated by the magnet assembly,
and wherein one of the direction of the magnetic field and the direction of current flow moves with the handle portion when the handle portion is twisted, and the other of the direction of the magnetic field and the direction of current flow is stationary when the handle portion is twisted.

17. The method of claim 16, wherein the magnet assembly is secured relative to one of: the handle portion and a base portion of the manual control device, the magnet assembly generating the magnetic field; and the magnetoresistive sensor includes a magnetoresistive sensor element secured relative to the other of: the handle portion and the base portion, the magnetoresistive sensor element including the magnetoresistive material.

18. The method of claim 17, wherein the magnetoresistive sensor element includes at least one Wheatstone bridge circuit having leg elements formed from magnetoresistive material.

19. The method of claim 17, wherein the magnet assembly includes at least one magnet coupled to a flux ring to form a magnetic circuit.

20. The method of claim of claim 18, wherein the magnetoresistive sensor element includes two Wheatstone bridge circuits disposed on a common substrate, the two Wheatstone bridge circuits being positioned at an offset angle of 45 degrees to each other.

21. A control device comprising:
a base portion disposed at one side of a panel and including a magnet component and a first set of sensors; and
a handle portion extending from the base portion to the other side of the panel, the handle portion having less electromagnetic shielding than the base portion, the handle portion including a substantially cylindrical housing and a second set of sensors so that the first set of sensors and the second set of sensors are disposed on opposite sides of the panel, the housing disposed around the second set of sensors and having an interior wall radially displaced from the second set of sensors and an exposed exterior wall, the second set of sensors including a magnetoresistive sensor including a magnet assembly secured relative to the handle portion, the magnet assembly including two permanent magnets and a flux ring, the magnets connected to the flux ring to form a magnetic circuit, and a magnetoresistive sensor element secured relative to the base portion, the magnetoresistive sensor element including two circuits each including magnetoresistive material and configured to provide a first output signal and a second output signal respectively, wherein a ratio of the output signals is indicative of a twist angle of the handle portion relative to the base portion, while said ratio is not affected by a temperature in the handle portion or by changes in magnetic field intensity in the handle portion, and the the housing and one of the magnetoresistive sensor element and the magnet assembly twist as one in accordance with twist of the handle portion.

22. The control device of claim 21 wherein the magnetoresistive sensor element includes two Wheatstone bridge circuits disposed on a common substrate, each Wheatstone bridge circuit having leg elements formed from the magnetoresistive material, the two Wheatstone bridge circuits being positioned at an offset angle of 45° to each other.

23. The control device of claim 21 wherein the twist angle is given as $\alpha$, the first output signal is given as X and is related to the twist angle by $X=X_0 \sin 2\alpha$, and the second output signal is given as Y and is related to the twist angle by $Y=Y_0 \cos 2\alpha$, so that the first output signal X and the second output signal Y have a phase angle of 90° between them for any angle $\alpha$.

24. The control device of claim 21, wherein the magnetoresistive sensor is attached to a grip portion of the handle portion, where the grip portion is held by an operator of the device.

25. The control device of claim 21, wherein the handle portion is movable from side to side in an X direction, and forward and backward in a Y direction perpendicular to the X direction, and wherein the first set of sensors in the base portion includes at least one sensor for detecting a position of the handle portion in the X and Y directions.

26. The control device of claim 23, wherein the two circuits are configured so that $X_0$ and $Y_0$ are substantially equal.

27. The control device of claim 23, wherein the twist angle $\alpha$ is related to the ratio of the output signals by $\alpha=\frac{1}{2}$ arctan (X/Y).

28. The control device of claim 25, wherein the first set of sensors includes Hall effect sensors.

* * * * *